April 20, 1954
W. C. KEEBLER
2,675,725
LIVE CENTER
Filed May 28, 1951
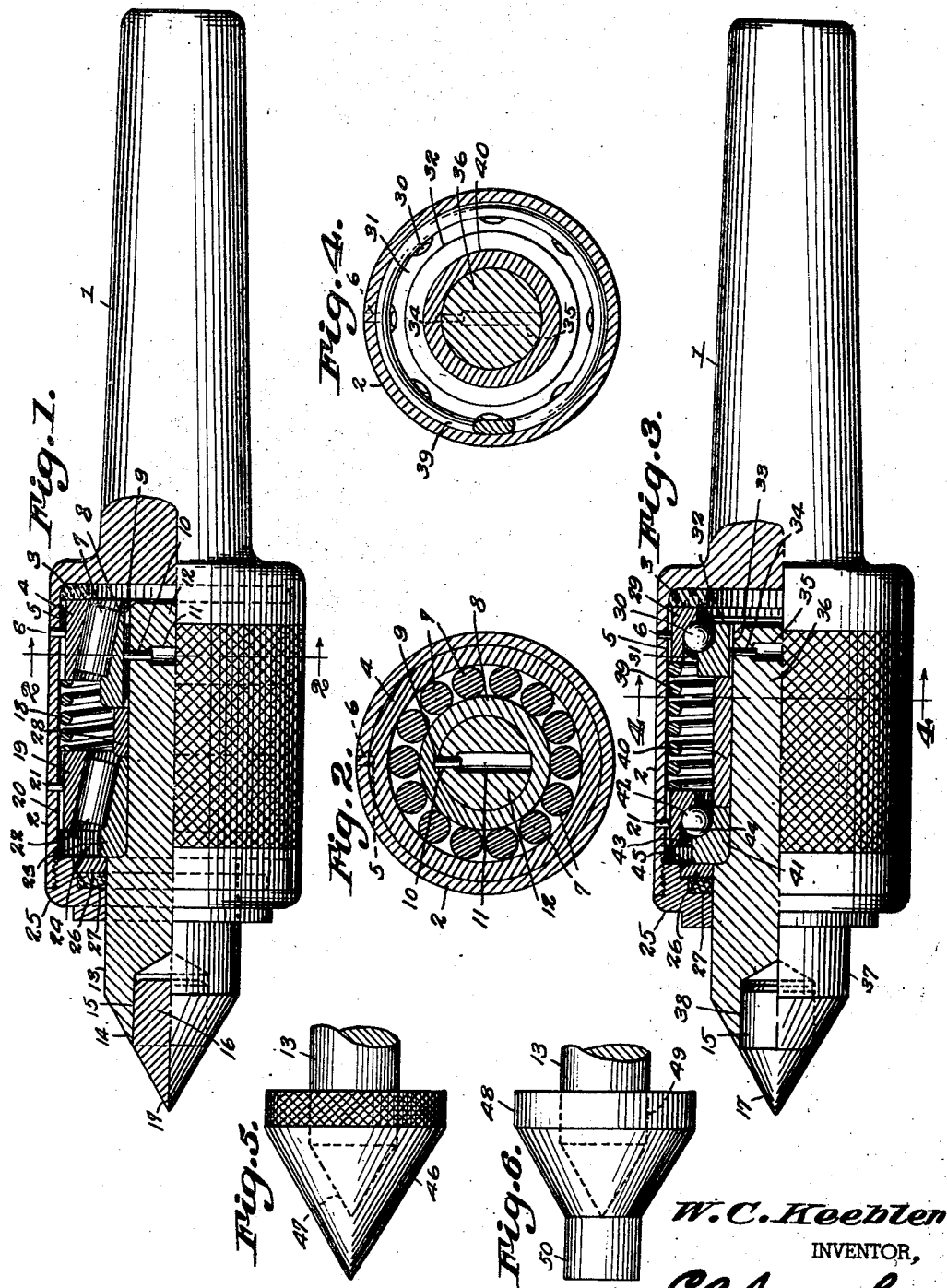
W. C. Keebler
INVENTOR,
BY C. A. Snow & Co.
ATTORNEYS.

Patented Apr. 20, 1954

2,675,725

UNITED STATES PATENT OFFICE 2,675,725

LIVE CENTER

William C. Keebler, Washington, D. C.

Application May 28, 1951, Serial No. 228,661

1 Claim. (Cl. 82—33)

This invention relates to lathe centers, and more particularly, has reference to live centers of the bearing type, the construction embodied in the invention being particularly adapted to use either ball or roller bearings.

By way of background, it may be noted that in use, a live lathe center of the bearing type is subjected to two separate pressures, namely, end or axial thrust, and radial thrust.

The end thrust is directed along lines extending parallel to the longitudinal axis of the center, while the radial thrust is exerted at right angles to the axis of the center.

The main object of the present invention is to provide a center of the type stated so designed as to take-up both of these loads in such a way that the loads are exerted uniformly on both of a pair of spaced bearings, whether these bearings be roller or ball bearings, while at the same time providing automatically a take up for wear of the bearings.

Another important object is to provide a center of the character described in which the end thrust load is assumed cushionably, the arrangement being one which not only provides an improved means for assuming said end thrust load, but also, automatically gives space needed while the work is held between centers, said space being needed on account of expansion of the work while being machined.

Still another object is to provide a center of the character described in which the means providing for take-up due to bearing wear will center or true up the work-engaging tip.

Still another object is to provide a lathe center as described in which the substitution of new parts for old, for example, the substitution of new bearings for bearings which have been completely worn, can be effected with speed and ease.

Yet another object is to provide a bearing center as described that can be manufactured at relatively low cost, but which will nevertheless be of high durability, so as to be adapted for heavy duty work and rough treatment, while still remaining a precision bearing.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings,

Fig. 1 is a view partly in longitudinal section and partly in side elevation, of a center formed in acordance with the present invention.

Fig. 2 is a section taken substantially on line 2—2 of Fig. 1.

Fig. 3 is a view similar to Fig. 1 and showing a modified center.

Fig. 4 is a section taken on line 4—4 of Fig. 3.

Fig. 5 is an elevation of an adaptor tip.

Fig. 6 is an elevation of a modified adaptor tip.

Referring to the drawings in detail, a tapered shank 1 is adapted to fit into a tapered hole in the tail stock of a lathe, not shown, and said shank can be formed with any suitable taper known in the art.

At its front end, the shank 1 is integrally formed with a cylindrical bearing housing 2 having an axial recess in the inner end of which is fitted an annular cork liner 3 against which abuts a rear tapered roller bearing cup 4, that is provided with a keyway 5 receiving a dowel or pin 6 immovably fixed in and extending inwardly of the wall of the housing 2. The cup 4 is a slip fit in the housing, and may slide longitudinally thereof.

The rear tapered roller bearing of which cup 4 is a part includes also an annular series of roller bearings 7, rolling on the rear tapered bearing cone 8. The cone 8 has a keyway 9 receiving a pin 10 mounted in a counterbored opening 11 formed in the cylindrical rear end portion 12 of a head 13 projecting forwardly from the housing 2 and formed with a frusto-conical tip portion 14 formed with an axial recess 15 adapted to receive a stud 16 formed upon a high speed steel or carbaloy tip 17.

As will be seen, the rear tapered bearing cone 8 is a slip fit upon the rear end portion 12, and may be relatively slidable longitudinally thereof.

Slip fitted in the housing 2, and abutting at one end against the cone 4 is a coil spring 18 held under compression between said cone 4 and a front tapered roller bearing cone 19. The cone 19 has a keyway 20 receiving a pin 21 mounted in the wall of the housing 2, whereby cone 19 is slidable longitudinally of and within the housing.

The front bearing includes also the annular series of rollers 22, rolling upon the front cone 23, that is press fitted upon the cylindrical portion 12, in engagement with a circumferential shoulder defined by formation of the cylindrical portion 12 to a lesser diameter than the diameter of the head 13.

Disposed forwardly of the front cone 23 is a space 24, adjacent a collar 25 exteriorly threaded for threaded engagement with internal threads formed upon the open end of the housing 2.

The collar 25 is formed with stepped recesses receiving, respectively, a ring 26 and a felt washer 27.

Interposed between the front and rear cups is an annular bushing 28, providing means whereby end thrust received by the front cone is transmitted directly to the rear cone.

In use of the center illustrated in Fig. 1, end thrust and radial loads imposed upon the work-engaging head are transmitted to the bearing cones. Through the medium of the bushing 28, said end thrust is taken uniformly by both the front and rear bearing cones, and is transmitted from said cones through the rollers of both bearings. End thrust received by the front bearing cup 19 is imposed against the spring 18, and transmitted to the rear bearing cup 4, which presses against the cork liner 3, that compresses or gives to give a springiness or resiliency to the assumption of the end thrust load by the bearing center. At the same time, end thrust transmitted directly from the rear bearing cone through the rear rollers to the rear cup 4 is transmitted to said compressible cork liner 3. The net result is to cushion considerably the assumption of the end thrust load by the device, and a further highly desirable result is obtained by reason of the fact that during machining of a piece of work, said piece of work will expand, so that more space is needed. The compressible cork liner gives as necessary due to expansion of the work, so that said expansion of the work does not affect adversely the normal operation of the live center in any way.

It is to be further noted that the spring 18 is held continuously under compression so as to exert constant pressure against the front bearing cup 19, thereby to provide automatically a take-up for wear of the front bearing.

At the same time, take-up for wear of the rear bearing is provided for, by reason of the fact that the rear bearing cone is continuously forced to the right in Fig. 1, along lines parallel to the axis of the bearing center, whereby to take up for wear of the rear rollers. At the same time the cushioned backing provided for the bearing cups of both bearings, in cooperation with the slidable mounting of said bearing cups, allows for relative longitudinal movement between the head, end portion 12, and both bearings as one unit, and the shank 1 and housing 2 as another unit.

Referring now to the center illustrated in Figs. 3 and 4, the shank 1 and housing 2 are formed as in the first form of the invention. In this form of the invention, however, ball bearings are used instead of roller bearings. The operating principle is nevertheless retained, and in carrying out this principle, I provide a rear bearing cup 29, of a ball bearing of the angular type, which type of bearing may be considered as a combination of a radial and a thrust bearing.

Seated against the cup 29 is an annular series of balls 30 contained by a ball cage 31. The cup 32 of said bearing has a keyway 33 receiving pin 34 mounted in the counterbored opening 35 of the cylindrical rear end portion 36 of a head 37 having a recess 38 adapted to receive a high speed tip such as shown in Fig. 1.

A spring 39 is held under compression between the rear cup 29 and the front ball bearing, which will be presently described. The spring 39 surrounds and is spaced from the annular bushing 40, that is slip fitted upon the portion 36, the bushing abutting at opposite ends directly against the rear cone and a front cone 41, the front cone 41 being part of the front ball bearing that also includes the annular series of balls 42 contained by a cage 43 and rolling against the front cup 44.

Surrounding the front cone 41, and forward of the front cup 44, is a space 45 adjacent a threaded collar 25 formed as in the first form of the invention. The collar 25 has a felt washer 27 and a ring 26.

In operation, the center of Fig. 3 functions in the same manner as the center of Fig. 1. In other words, end thrust is taken uniformly by both of the bearing cups, being transmitted from one to the other by the bushing 40. The end thrust is transmitted to the bearing cups, and is cushionably assumed by the compressible cork liner 3. Take-up for wear is provided by the spring 39 as well as by the cork liner 3, and expansion of work during machining thereof is allowed by the liner.

In Figs. 5 and 6 I have illustrated adaptors which can be used on centers formed as described above. In Fig. 5 the adaptor is fitted directly upon the head 13, and is designated 46, this being a conical adaptor adapted for the machining of tubing, and being formed with a recess 47 shaped to receive the tip of the head 13.

In Fig. 6, the adaptor 48 has a recess 49 proportioned to receive the head 13, the adaptor 48 having a frusto-conical portion merging into the cylindrical end portion 50 which, again, is usable for the performance of special tasks on work pieces, such as those that are in the chuck and require support for the tail stock and which may quite possibly have no center in their ends.

What is claimed is:

A live center for a lathe or the like comprising an elongated tapered shank, a head carried by the shank and extending longitudinally therefrom adjacent the larger end thereof, said head having an axial bore extending thereinto through the end thereof remote from the shank, an annular cushion seated against the bottom of the recess, an outer bearing race seated against the cushion and having a longitudinal groove extending therethrough and opening through the periphery thereof, a guide pin carried by the head and entering the groove and holding the outer bearing race against rotary movement while permitting longitudinal movement thereof relative to the head, a second outer bearing race within the recess adjacent the end thereof remote from the cushion, said second outer bearing race having a longitudinal groove extending therethrough and opening through the periphery thereof, a second guide pin carried by the head in spaced parallel relation to the first mentioned guide pin, said second guide pin entering the groove in the second mentioned outer bearing race for holding said race against rotary movement while permitting longitudinal movement thereof relative to the head, a compression coiled spring within the recess between the outer bearing races, said spring engaging the adjacent ends of said outer bearing races to yieldingly urge said races to move in opposite directions in the recess, an elongated spindle extending through the end of the recess remote from the shank, an inner bearing race carried by the spindle adjacent the end thereof remote from the bottom of the recess, a second inner bearing race carried by the spindle adjacent the bottom of the recess, said second inner bearing race having a longitudinal groove extending therethrough and opening through the inner periphery thereof, a pin carried by the spindle and projecting into the groove for holding the second inner bearing race against rotation relative to the spindle while permitting longitudinal movement between said bearing race and the spindle, a spacing ring encircling the spindle between and engaging the inner bearing races, antifriction bearings between the inner and outer bearing races, a retaining ring threadedly engaged with the head and bearing on the first mentioned inner race for holding the spindle in place in the recess and an annular cushion between said retaining ring and said first mentioned inner bearing ring.

References Cited in the file of this patent

UNITED STATES PATENTS

| Number | Name | Date |
|---|---|---|
| 1,688,040 | Flinn | Oct. 16, 1928 |
| 1,700,837 | Fisher | Feb. 5, 1929 |
| 1,747,385 | Olson et al. | Feb. 18, 1930 |
| 1,993,809 | Schnelle | Mar. 12, 1935 |
| 2,091,864 | Kline | Aug. 31, 1937 |
| 2,126,963 | Kennedy | Aug. 16, 1938 |
| 2,314,622 | Klamp | Mar. 23, 1943 |
| 2,571,363 | Hoelscher | Oct. 16, 1951 |